United States Patent
Lake et al.

(10) Patent No.: US 11,216,272 B1
(45) Date of Patent: Jan. 4, 2022

(54) AUTOMATIC MODIFICATION OF REPOSITORY FILES

(71) Applicant: Palantir Technologies Inc., Palo Alto, CA (US)

(72) Inventors: Alexander Lake, Palo Alto, CA (US); Vlad Victor Ungureanu, Seattle, WA (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 0 days.

(21) Appl. No.: 16/142,017

(22) Filed: Sep. 26, 2018

Related U.S. Application Data (60) Provisional application No. 62/678,950, filed on May 31, 2018.

(51) Int. Cl.
    *G06F 9/44*     (2018.01)
    *G06F 8/71*     (2018.01)

(52) U.S. Cl.
    CPC ..................... *G06F 8/71* (2013.01)

(58) Field of Classification Search
    CPC ........................................................ G06F 8/71
    USPC ........................................................ 717/121
    See application file for complete search history.

(56) References Cited

U.S. PATENT DOCUMENTS

| | | | | | |
|---|---|---|---|---|---|
| 4,864,569 | A * | 9/1989 | DeLucia | ................. | G06F 8/71 714/38.1 |
| 6,149,318 | A * | 11/2000 | Chase | ................. | G06F 8/437 714/E11.209 |
| 7,519,953 | B2 * | 4/2009 | Reissman | ............ | G06F 11/3672 707/999.102 |
| 7,890,551 | B2 * | 2/2011 | Benelisha | ............. | G06F 16/148 707/821 |
| 7,979,466 | B2 * | 7/2011 | Wagner | ................ | G06F 21/6218 707/781 |
| 9,298,590 | B2 * | 3/2016 | Kim | ..................... | G06F 11/3688 |
| 9,483,384 | B2 * | 11/2016 | Yoshida | ................ | G06F 11/368 |
| 10,613,969 | B2 * | 4/2020 | Zacks | ................. | G06F 11/3636 |
| 10,644,980 | B2 * | 5/2020 | Lyons | ..................... | H04L 43/16 |
| 10,826,767 | B2 * | 11/2020 | Barkovic | ................ | H04L 63/20 |
| 2007/0113120 | A1 * | 5/2007 | Dodge | ................ | G06F 11/1068 714/703 |

(Continued)

FOREIGN PATENT DOCUMENTS

EP              0619543 A1 * 10/1994              G06F 8/71

*Primary Examiner* — Evral E Bodden
(74) *Attorney, Agent, or Firm* — Hickman Becker Bingham Ledesma LLP (57) ABSTRACT

In an embodiment, a method comprises accessing a first computer program source code file from among a plurality of files in a computer program source code repository; applying a first check to the first source code file, from among a plurality of stored checks, each of the checks comprising a set of expected source code instructions; determining whether applying the first check results in generating differential output in the repository, and in response thereto, requesting the repository to initiate a change request in relation to the first source code file, the change request comprising metadata relating to the expected source code instructions; repeating the applying and the determining, for all other checks in the plurality of stored checks; repeating the accessing, the applying and the determining, for all other files in the plurality of files.

10 Claims, 4 Drawing Sheets

(56) References Cited

U.S. PATENT DOCUMENTS

| | | | |
|---|---|---|---|
| 2007/0245311 A1* | 10/2007 | Bumgarner | G06F 9/544 717/120 |
| 2010/0333061 A1* | 12/2010 | Mohalik | G06F 8/35 717/104 |
| 2011/0078658 A1* | 3/2011 | Misch | G06F 8/71 717/121 |

* cited by examiner

AUTOMATIC MODIFICATION OF REPOSITORY FILES

BENEFIT CLAIM

This application claims the benefit under 35 U.S.C. 119(e) of provisional application 62/678,950, filed May 31, 2018, the entire contents of which are hereby incorporated by reference for all purposes as if fully set forth herein.

TECHNICAL FIELD

The present disclosure relates to configuration of clusters of repositories. More specifically, the disclosure relates to automatic derivation of repository configuration settings and configuration of clusters of repositories based on a configuration file.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The professional software development ecosystem now includes source code version control systems, build tools, continuous integration (CI) managers, binary repositories, containerization tools and deployment tools. Development of complex software involves creating computer program source code in numerous different stored source files, usually using a repository system for organization and code control. Over time, different teams may introduce similar bugs or issues into different files or in different libraries, yet be unaware of changes to correct the bugs or issues that were implemented by different teams. Changes may result in modifications to dependencies. Scripts may need certain specific options to ensure trouble-free operation. Product configuration changes that are decided on a central basis may require modification of numerous files or settings to ensure consistent implementation. However, in current practice all these kinds of tedious changes require manual implementation, which costs time, extends deployment time and increases the likelihood that bugs will remain in a system.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

While each of the figures illustrates a particular embodiment for purposes of illustrating a clear example, other embodiments may omit, add to, reorder, and/or modify any of the elements shown in the figures.

DESCRIPTION OF THE EXAMPLE EMBODIMENT(S)

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1.0 GENERAL OVERVIEW
2.0 EXAMPLE COMPUTER SYSTEM IMPLEMENTATION
   2.1 ARTIFACT REPOSITORY
3.0 EXAMPLE PROCESS AND ALGORITHM
4.0 IMPLEMENTATION MECHANISMS—HARDWARE OVERVIEW
5.0 IMPLEMENTATION MECHANISMS—SOFTWARE OVERVIEW
6.0 OTHER ASPECTS OF DISCLOSURE 1.0 General Overview An automated software system is programmed to accept definitions of tests or checks to be performed on source code files in a specified repository. In operation, in one embodiment, the system visits a repository, inspects source code files in the repository, and applies each of the checks to each file, resulting in generating a difference (diff) file. Checks may define detecting undesirable code; moving parameters from one library to another; adding instructions to a YAML build script file to cause collecting build metadata or build timing or other metrics or publish other build information to a specified location; enforcing that certain batch scripts have specified options defined; imposing a specified product configuration relating to security or other practices; change headers; or other transformations.

If a check results in a diff, then a pull request is made against the repository, with a tag identifying the owner of the repository and an identification of the changes. Each pull request is associated with an issue. As a result, the owner of the repository is prompted automatically and requested to confirm the change to resolve the issue. The implementation is language-neutral, using a single runtime, plus multiple separate language drivers to direct the use of different language-specific method implementations, which provide the correct results for each language.

Load scaling is controlled using a coordinator thread and one or more worker threads to avoid overloading repository hosts. The coordinator thread and worker threads may be separate threads or processes executing on the same host or different hosts. Manual shepherding of numerous checks that will always be approved can be avoided using an automatic merge technique.

In an embodiment, a method comprises accessing a first computer program source code file from among a plurality of files in a computer program source code repository; applying a first check to the first source code file, from among a plurality of stored checks, each of the checks comprising a set of expected source code instructions; determining whether applying the first check results in generating differential output in the repository, and in response thereto, requesting the repository to initiate a change request in relation to the first source code file, the change request comprising metadata relating to the expected source code instructions; repeating the applying and the determining, for all other checks in the plurality of stored checks; repeating the accessing, the applying and the determining, for all other files in the plurality of files.

2.0 Example Computer System Implementation

Figure 1:
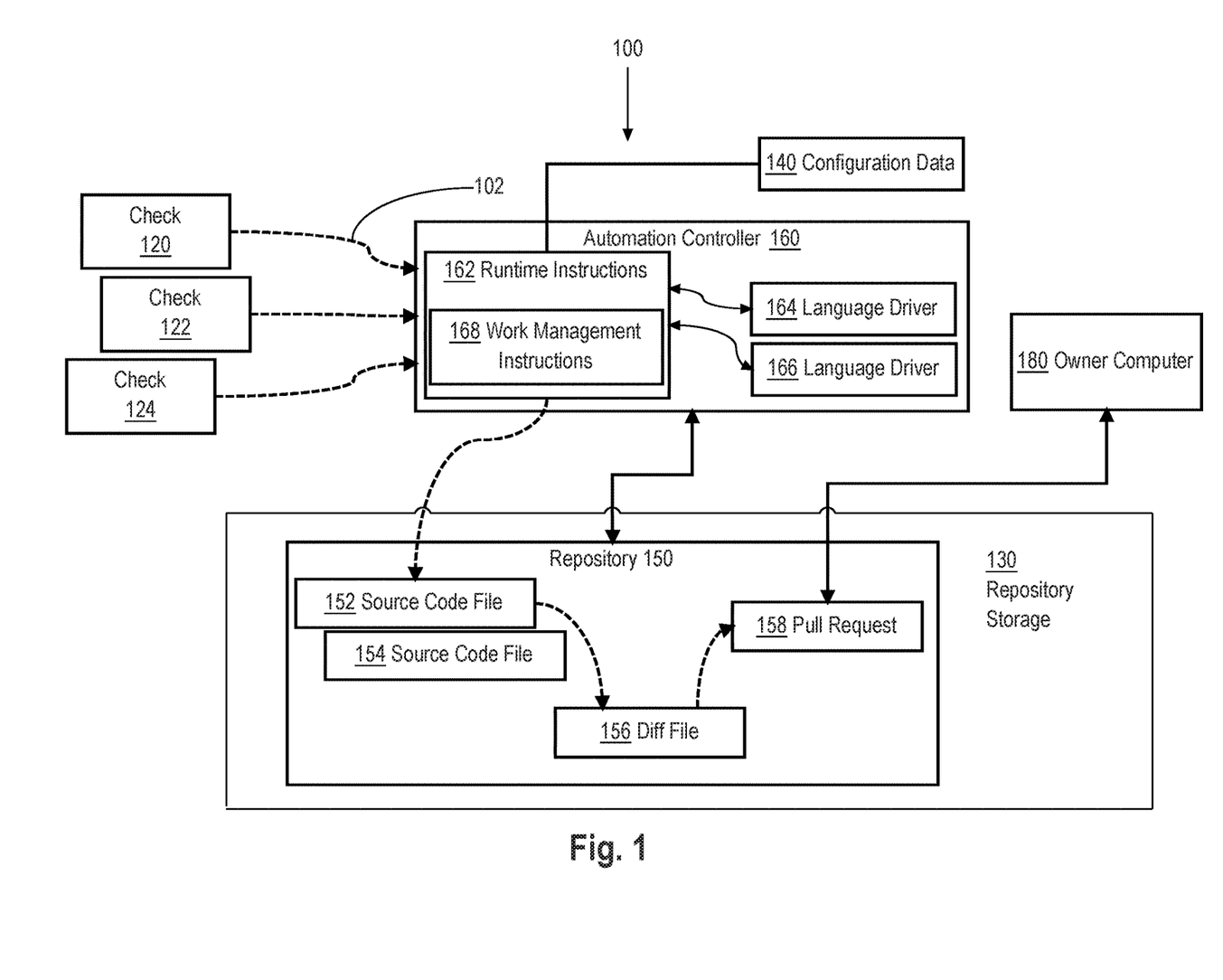
FIG. 1 is an example of an automation system, according to one embodiment.

FIG. 1 illustrates an example automation system in which the techniques described herein may be practiced, according to some embodiments.

Automation system 100 is programmed or configured to provide automated application of checks of a variety of kinds to source code files or other digital content that is stored in a repository. Automation system 100 may be implemented across one or more physical or virtual computing devices, none of which is intended as a generic computer, since it is loaded with instructions in a new ordered combination as otherwise disclosed herein to implement the functions and algorithms of this disclosure. The example components of automation system 100 in FIG. 1 are implemented at least partially by hardware at one or more computing devices, such as one or more hardware processors executing stored program instructions stored in one or more memories for performing the functions that are described herein. Or, one or more virtual machine instances in a shared computing facility such as a cloud computing center may be used. The functions described herein are intended to indicate operations that are performed using programming in a special-purpose computer or general-purpose computer, in various embodiments. Automation system 100 illustrates only one of many possible arrangements of components configured to execute the programming described herein. Other arrangements may include fewer or different components, and the division of work between the components may vary depending on the arrangement.

In an embodiment, automation system comprises a plurality of digitally stored checks 120, 122, 124 and an automation controller that is coupled via one or more network links to a repository storage 130 having one or more source code repositories 150. An owner computer 180 may be communicatively coupled via network links to the repository storage 130.

Checks 120, 122, 124 may be stored in a flat file, optionally in the repository storage 130, in a database, or any other convenient digital data storage that automation controller 160 can access. In an embodiment, each of the checks 120, 122, 124 comprises a set of digitally stored data that defines computer program code, parameter settings, configuration values, or other data. In general, checks 120, 122, 124 define content that should be represented in the repository 150 based upon policy, security requirements or other goals, but may not be. Checks 120, 122, 124 may define code that is expected to be used, represents best practices or requirements, that is bug-free, or otherwise desirable. Checks 120, 122, 124 may define configuration values or parameter settings that are specified in or required by policy or for compatibility.

As an example, checks 120, 122, 124 may be used to upgrade a library across multiple repositories 150 that are used in distributed locations by a user group. For example, different copies of libraries may have bad code and there may be a need to blacklist that code and force downstream code to rely on improved changes. The checks 120, 122, 124 may include regular expressions or configuration instructions that runtime instructions 162 of automation controller 160 can use to detect undesired code. Or, checks 120, 122, 124 may include executable code that automation controller 160 can dynamically link to runtime instructions 162 to perform detection.

Other examples of actions that checks 120, 122, 124 can cause performing include:

1. Moving parameter values from one library to another as a result of code changes.

2. Adding instructions to a configuration file in repository 150 to cause collecting build metadata or build timing when the source code files are built to an executable.

3. Modifications to contents of files in the repository 150.

4. Causing adding hook code which when executed causes publishing information about a build to a centralized location, for the purpose of diagnosing performance issues.

5. Linting—enforcing that certain batch scripts have certain options defined in headers or other locations that are processed first. Linting checks 120, 122, 124 may define assertions that must be true for scripts to execute in a desired manner, as inconsistent switches could cause dependency on vulnerable libraries, out of date libraries, bugs where options are not defined properly, or performance issues.

6. Product configuration—impose a default configuration and update it over time.

7. Adding security best practices to code files such as imposing a minimum type of encryption algorithm or encryption key length.

8. Add correct or updated copyright headers.

9. Modify terms of license files.

10. Ensure that a plugin is in the code that will cause blacklisting the file, thus preventing it from being published to other users, if an impermissible library was included.

Repository storage 130 may comprise a filesystem managed by an operating system of a computer, a database, or distributed external storage repository, in various embodiments; for example, various embodiments may GITHUB ENTERPRISE or BITBUCKET as repository storage 130. Repository 150 digitally stores a plurality of source code files 152, 154 that contain computer program source code for projects of any nature. For purposes of illustrating a clear example, the term "source file" is used in reference to files 152, 154 but in other embodiments, the files may comprise non-program text files such as license agreements, header files, configuration data or settings files, or any other file or digital content that may be associated with a computer program project.

In some embodiments, repository storage 150 may be organized into many different repositories, each having a plurality of projects, and the source code files 152, 154 may be associated with different projects or the same projects, or different repositories. Practical embodiments may have thousands of repositories 150 in repository storage 130.

Operation of the automation controller 160 as further described herein may result in creating and storing one or more sets of differential output in the form of diff files 156. Each diff file 156 comprises data representing differences between a source code file 152, 154 and one or more of checks 120, 122, 124. Operation of the automation controller 160 as further described herein may result in generating and transmitting one or more change requests, such as pull requests 158. A change request is a notification, to an account associated with a user who is designated as owner of the repository 150, that another account or system has proposed or is requesting changes to content in the repository.

Automation controller 160 may be implemented using any of the computing elements previously mentioned as part of automation system 100. Automation controller 160 may comprise one or more computer programs, other software elements, or sets of executable instructions that are organized, in one embodiment, as runtime instructions 162 capable of accessing one or more language drivers 164, 166, and work management instructions 168.

With this architecture, runtime instructions 162 are executed to provide basic functionality of the automation controller 160, and language drivers 164, 166 specify which implementations of check methods are to be used to provide functions, configuration parameters, or settings values that are specific to individual programming languages in which source code files 152, 154 are expressed. For example, language driver 164 could correspond to PYTHON and language driver 166 could correspond to JAVA or GO.

Each of the checks 120, 122, 124 may comprise multiple different implementations of underlying generic check methods, where the implementations correspond to different languages. For example, a check 120, 122, 124 may specify an entry point and a driver for the associated language, and then causes the runtime to invoke an implementation of the method compatible with the specified language. In some implementations, this process is equivalent to dynamically linking a language driver 164, 166 to runtime instructions 162 and invoking the linked runtime and an implementation of a check method that is compatible with the runtime and the target language. The check method implementations for different languages are programmed or configured to parse and interpret source code program files in particular languages to locate specified code, parameter values, scripts, settings or other content to carry out the modification, transformation or filtering operations specified in the checks.

Furthermore, automation controller 160 may read configuration data 140 to obtain configuration parameters, settings values or other data to drive operation of the automation controller. Configuration data 140 may be stored in a flat file, optionally in the repository storage 130, in a database, or any other convenient digital data storage.

Embodiments can be implemented for use with thousands of different checks for execution on thousands of different source code files 152. When thousands of repositories are in the repository 150, load distribution may be needed to process checks 120, 122, 124 and many other checks in a timely manner. In an embodiment, work management instructions 168 may be programmed or configured to implement CPU work management operations that cause automated execution under control of a coordinator thread that instantiates one or more worker threads to perform the work of applying a particular check, or set of checks, to a particular set of files, projects or repositories.

The coordinator thread is programmed to load checks 120, 122, 124 or other checks and to distribute the checks to worker threads. Each worker thread may manage a queue of checks and dequeue checks from the queue on a first-in, first-out basis for application to source code files. The coordinator thread may be programmed to use a cron job schedule that executes every hour, and to read a reference list of repositories from configuration data 140; the reference list identifies repositories that need checks applied. The coordinator thread may use regular expression matching to match names of repositories in the reference list to names of actual repositories 150 in repository storage 130.

The coordinator thread may be programmed to distribute work using hash values to assign checks to worker threads; this approach ensures that the same worker thread receives all checks for the same repository, to avoid the overload that otherwise would be involved in cloning repositories for multiple different workers. Consequently, throughput increases without cloning overhead.

In some cases, configuration data 140 or a check 120 may indicate that the particular check is important and should be applied immediately without delay imposed by the coordinator thread. For example, when processing a first check 120, the runtime instructions 162 may be programmed to inspect that check or configuration data 140 to determine whether that check should be provided to a new worker thread that is instantiated just to perform that check immediately, rather than routing the check to a work queue of an existing worker thread.

Owner computer 180 may comprise any computing device that is associated with or used by an account or user who is designated as owner of the repository 150.

FIG. 1 is illustrated in simplified form for purposes of illustrating a clear example. In other embodiments, there may be multiple instances of all elements shown in FIG. 1. For example, there is no limit, in an implementation, on the number of repositories 150, projects, source code files, checks, instances of runtime instructions 162, or language drivers 164, 166.

3.0 Example Process and Algorithm

Figure 2:
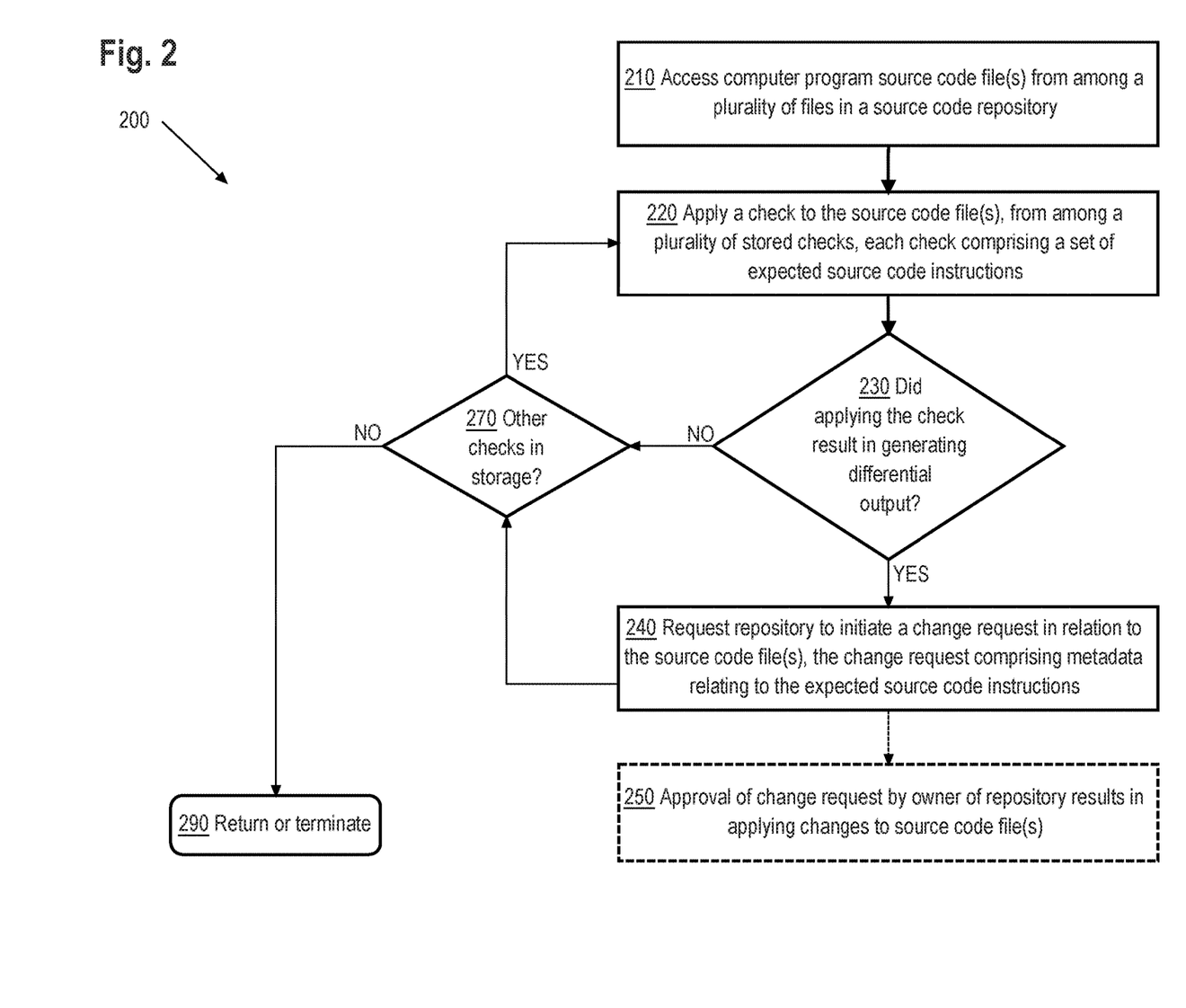
FIG. 2 is a flow diagram of an example process for performing automated modification of repository files, according to one embodiment.

FIG. 2 is a flow diagram of an example process for performing automated modification of repository files, according to one embodiment.

FIG. 2 is intended to disclose algorithms or functional descriptions that may be used as a basis of writing computer programs to implement the functions that are described herein, and which cause a computer to operate in the new manner that is disclosed herein. Further, FIG. 2 is provided to communicate such an algorithm at the same level of detail that is normally used, by persons of skill in the art to which this disclosure is directed, to communicate among themselves about plans, designs, specifications and algorithms for other computer programs of a similar level of complexity. The steps of process 200 may be performed in any order, and is not limited to the order shown in FIG. 2.

Generally, FIG. 2 illustrates one embodiment of a computer-implemented algorithm for accessing a first computer program source code file from among a plurality of files in a computer program source code repository; applying a first check to the first source code file, from among a plurality of stored checks, each of the checks comprising a set of expected source code instructions; determining whether applying the first check results in generating differential output in the repository, and in response thereto, requesting the repository to initiate a change request in relation to the first source code file, the change request comprising metadata relating to the expected source code instructions; repeating the applying and the determining, for all other checks in the plurality of stored checks; and repeating the accessing, the applying and the determining, for all other files in the plurality of files.

The process 200 may begin in step 210 at which the process is programmed for accessing a computer program source code file from among a plurality of files in a computer program source code repository. For example, automation controller 160 accesses repository storage 130, and based on configuration data 140, first selects repository 150 for processing from among many other possibly available repositories and visits files in that repository. In an embodiment, automation controller 160 is programmed to visit each repository 150 in repository storage 130, based on the configuration data 140, and apply checks 120, 122, 124 across the repo.

At step 220, process 200 applies a check to the file that was accessed at step 210. For example, automation controller 160 reads or interprets the checks 120, 122, 124 and applies their requirements to the file that was accessed. Applying checks 120, 122, 124 to a file may include performing any of the operations or use cases that have been previously identified in this disclosure for the checks.

At step 230, the process tests whether applying the check resulted in generating differential output. In an embodiment, step 230 comprises testing whether applying checks 120, 122, 124 to the specified file resulted in creating a new diff file in the same repository 150; the automation controller 160 may be programmed to all an API method of the repository to query for a diff file or a new file.

If the test of step 230 is negative, then control passes to step 270 at which the process tests whether other checks are in storage. For example, a first pass through steps 210, 220, 230 may have addressed check 120 but other checks 122, 124 may be available in storage. If the test of step 270 is positive, then control loops back to step 220 to apply the next check to the specified file.

If the test of step 270 is negative, then control passes to step 290 at which the process may return control to another process or terminate. In this manner, the checks that are executed at step 220 are evaluated against all files in a particular repository. A looped process is defined for purposes of illustrating a clear example, but other embodiments may use a coordinator thread, worker threads and the work management instructions 168 to implement parallelism rather than serial processing and looping.

If the test of step 230 is positive, then at step 240, the process requests the repository to initiate a change request in relation to the source code file that was obtained at step 210. The change request typically comprises metadata relating to the expected source code instructions.

In an embodiment using GITHUB, step 240 may comprise generating a pull request. The pull request may tag the owner of the repository 150, for example, a user account identifier associated with owner computer 180. The metadata identifies the changes and requests to confirm a merge of changes or to discard the changes. Each pull request is associated with an issue in the repository storage 130, and accounts of repository owners receive notifications and can review the issue that is associated with a check.

Furthermore, automation controller 160 may be programmed to call API methods of the repository storage 130 to inspect open or closed pull requests that resulted from a check against multiple different libraries; checks 120, 122, 124 may be run again if versions change but pull requests have not been resolved. While automation controller 160 may implement timed, automatic review of previously generated pull requests, in some embodiments the review of open pull requests may be performed manually, for example, by an administrator.

In an embodiment, configuration data 140 can define a set of pre-approved checks 120, 122, 124. Automation controller 160 is programmed to test whether a check 120, 122, 124 is pre-approved, and in response, to mark the pull request 158 as merge-when-ready. In this approach, the pull request 158 causes the repository storage 130 to automatically merge the changes represented in the pull request into the specified file.

At step 250, via inherent execution of the repository storage 130, approval of the change request by an owner of the repository 150 results in applying the changes to the source code file. Dashed lines for step 250 indicate that this step may be performed independent of process 200. For example, repository storage 130 or repository 150 may perform step 250 asynchronously in response to input from owner computer 180 indicating approval of the change request or pull request that was generated at step 240.

As previously discussed, the remaining steps comprise repeating the applying and the determining, for all other checks in the plurality of stored checks; and repeating the accessing, the applying and the determining, for all other files in the plurality of files.

4.0 Implementation Mechanisms—Hardware Overview

Figure 3:
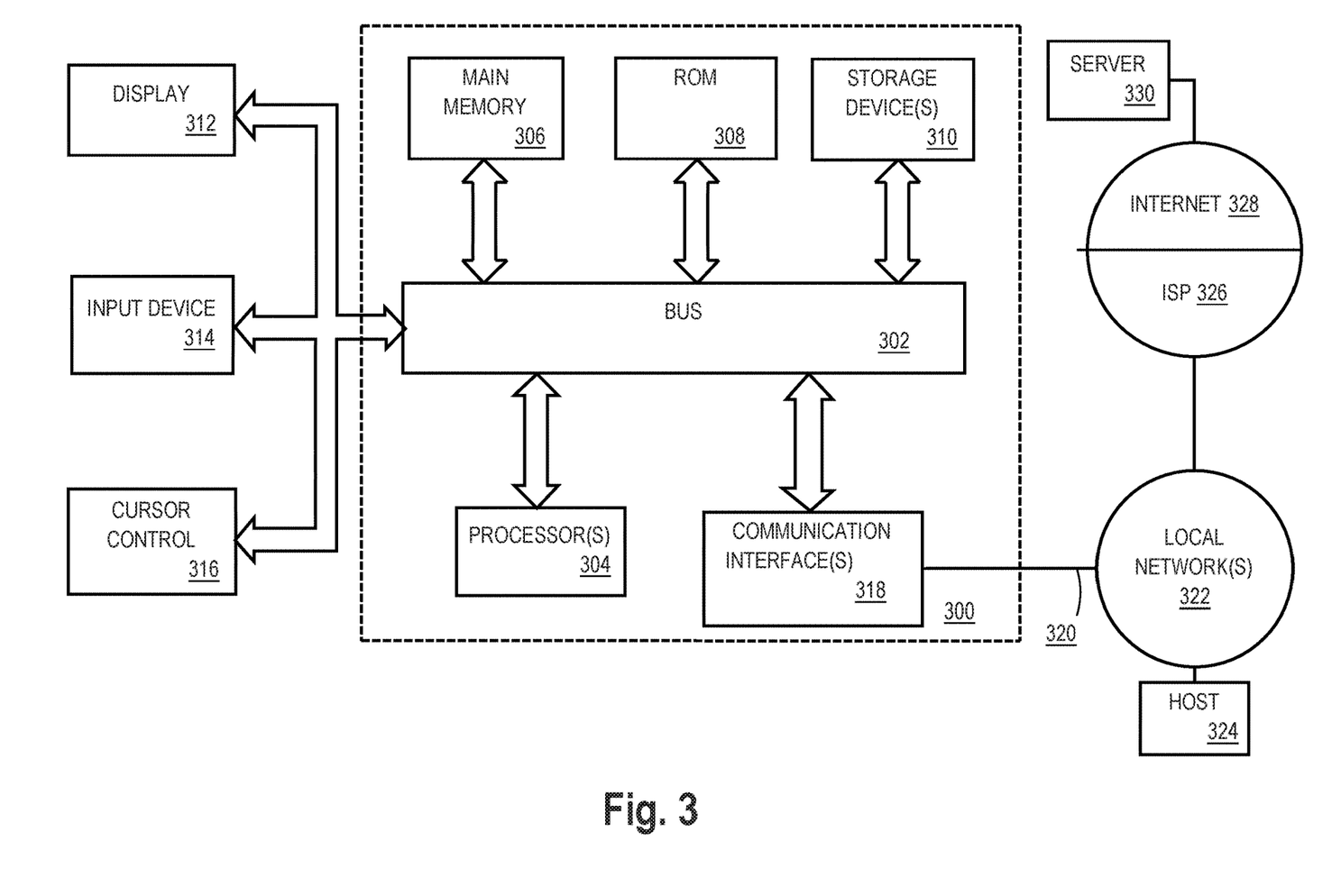
FIG. 3 is a block diagram of a computing device in which the example embodiment(s) of the present invention may be embodied.

Referring now to FIG. 3, it is a block diagram that illustrates a computing device 300 in which the example embodiment(s) of the present invention may be embodied. Computing device 300 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 300 may include a bus 302 or other communication mechanism for addressing main memory 306 and for transferring data between and among the various components of device 300.

Computing device 300 may also include one or more hardware processors 304 coupled with bus 302 for processing information. A hardware processor 304 may be a general-purpose microprocessor, a system on a chip (SoC), or other processor.

Main memory 306, such as a random-access memory (RAM) or other dynamic storage device, also may be coupled to bus 302 for storing information and software instructions to be executed by processor(s) 304. Main memory 306 also may be used for storing temporary variables or other intermediate information during execution of software instructions to be executed by processor(s) 304.

Software instructions, when stored in storage media accessible to processor(s) 304, render computing device 300 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 300 also may include read only memory (ROM) 308 or other static storage device coupled to bus 302 for storing static information and software instructions for processor(s) 304.

One or more mass storage devices 310 may be coupled to bus 302 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 310 (e.g., the main hard disk for the device) stores a body of program and data for directing operation of the computing device, including an operating system, user application programs, driver and other support files, as well as other data files of all sorts.

Computing device 300 may be coupled via bus 302 to display 312, such as a liquid crystal display (LCD) or other electronic visual display, for displaying information to a computer user. In some configurations, a touch sensitive surface incorporating touch detection technology (e.g., resistive, capacitive, etc.) may be overlaid on display 312 to form a touch sensitive display for communicating touch gesture (e.g., finger or stylus) input to processor(s) 304.

An input device 314, including alphanumeric and other keys, may be coupled to bus 302 for communicating information and command selections to processor 304. In addition to or instead of alphanumeric and other keys, input device 314 may include one or more physical buttons or switches such as, for example, a power (on/off) button, a "home" button, volume control buttons, or the like.

Another type of user input device may be a cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

While in some configurations, such as the configuration depicted in FIG. 3, one or more of display 312, input device 314, and cursor control 316 are external components (i.e., peripheral devices) of computing device 300, some or all of display 312, input device 314, and cursor control 316 are integrated as part of the form factor of computing device 300 in other configurations.

Functions of the disclosed systems, methods, and modules may be performed by computing device 300 in response to processor(s) 304 executing one or more programs of software instructions contained in main memory 306. Such software instructions may be read into main memory 306 from another storage medium, such as storage device(s) 310. Execution of the software instructions contained in main memory 306 cause processor(s) 304 to perform the functions of the example embodiment(s).

While functions and operations of the example embodiment(s) may be implemented entirely with software instructions, hard-wired or programmable circuitry of computing device 300 (e.g., an application-specific integrated circuit (ASIC), a field programmable gate array (FPGA), or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random-access memory (NVRAM), flash memory, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a compact disc read-only memory (CD-ROM), any other optical data storage medium, any physical medium with patterns of holes, a random-access memory (RAM), a programmable read-only memory (PROM), and erasable programmable read-only memory (EPROM), a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more software instructions to processor(s) 304 for execution. For example, the software instructions may initially be carried on a magnetic disk or solid-state drive of a remote computer. The remote computer can load the software instructions into its dynamic memory and send the software instructions over a telephone line using a modem. A modem local to computing device 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor(s) 304 retrieves and executes the software instructions. The software instructions received by main memory 306 may optionally be stored on storage device(s) 310 either before or after execution by processor(s) 304.

Computing device 300 also may include one or more communication interface(s) 318 coupled to bus 302. A communication interface 318 provides a two-way data communication coupling to a wired or wireless network link 320 that is connected to a local network 322 (e.g., Ethernet network, Wireless Local Area Network, cellular phone network, Bluetooth wireless network, or the like). Communication interface 318 sends and receives electrical, electromagnetic, or optical signals that carry digital data streams representing various types of information. For example, communication interface 318 may be a wired network interface card, a wireless network interface card with an integrated radio antenna, or a modem (e.g., ISDN, DSL, or cable modem).

Network link(s) 320 typically provide data communication through one or more networks to other data devices. For example, a network link 320 may provide a connection through a local network 322 to a host computer 324 or to data equipment operated by an Internet Service Provider (ISP) 326. ISP 326 in turn provides data communication services through the worldwide packet data communication network now commonly referred to as the "Internet" 328. Local network(s) 322 and Internet 328 use electrical, electromagnetic or optical signals that carry digital data streams. The signals through the various networks and the signals on network link(s) 320 and through communication interface(s) 318, which carry the digital data to and from computing device 300, are example forms of transmission media.

Computing device 300 can send messages and receive data, including program code, through the network(s), network link(s) 320 and communication interface(s) 318. In the Internet example, a server 330 might transmit a requested code for an application program through Internet 328, ISP 326, local network(s) 322 and communication interface(s) 318.

The received code may be executed by processor 304 as it is received, and/or stored in storage device 310, or other non-volatile storage for later execution.

5.0 Implementation Mechanisms—Software Overview

Figure 4:
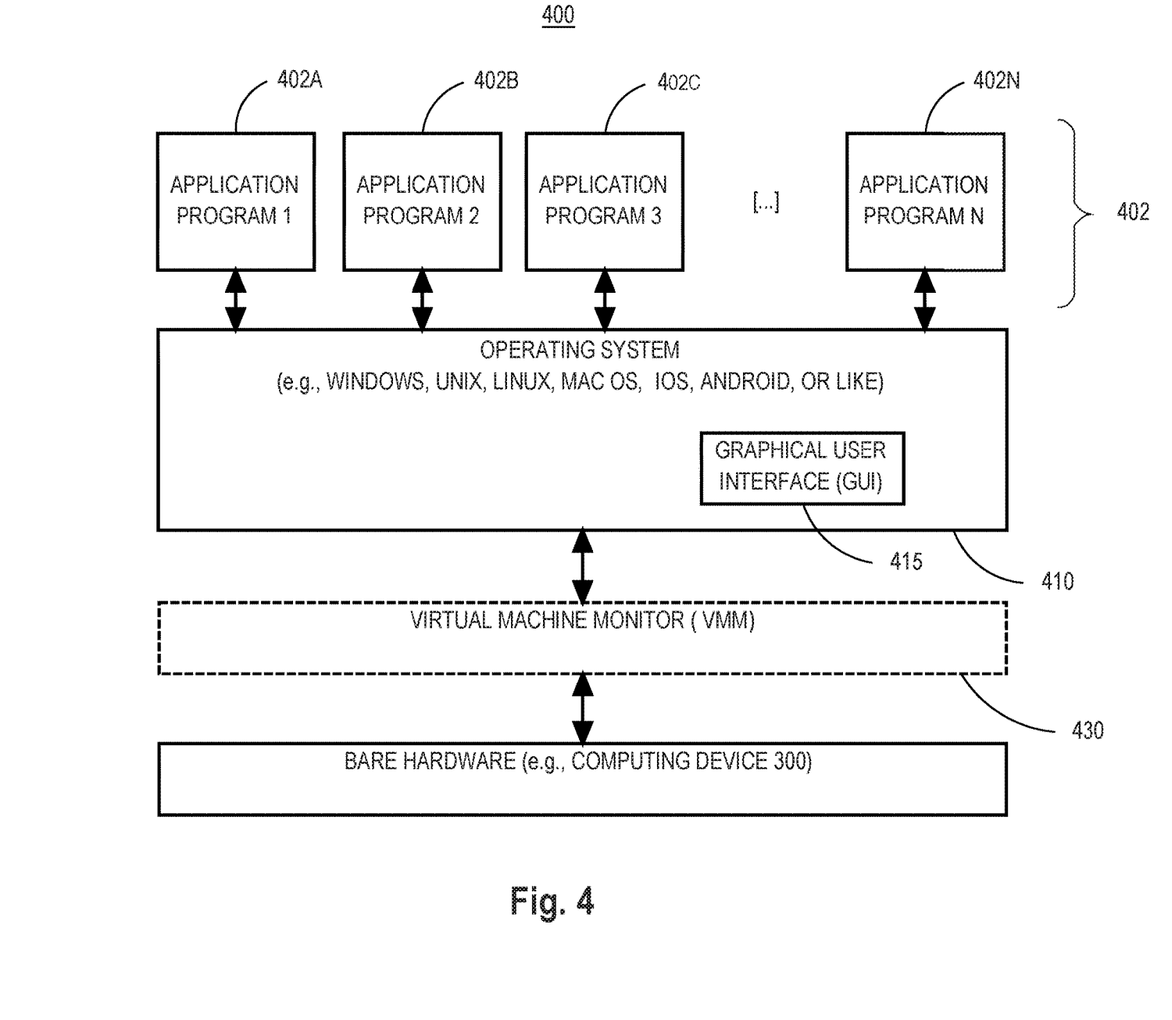
FIG. 4 is a block diagram of a software system for controlling the operation of the computing device.

FIG. 4 is a block diagram of a software system 400 that may be employed for controlling the operation of computing device 300. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing device 300. Software system 400, which may be stored in system memory (RAM) 306 and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 310 into memory 306) for execution by the system 400. The applications or other software intended for use on device 400 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 304) of device 300. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the device 300.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of device 300 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

The above-described computer hardware and software is presented for purpose of illustrating the underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

6.0 Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method comprising:
   accessing a first computer program source code file comprising a set of first source code instructions from among a plurality of files in a computer program source code repository;
   applying a first check to the first source code file, from among a plurality of stored checks,
      each of the checks comprising a set of expected source code instructions representing best practices or coding requirements and expected in one or more source code files,
      the best practices or coding requirements including configuration values or parameter settings that are specified in or required by policy or for compatibility;
   determining whether applying the first check to the first source code file results in generating differential source code output in the repository, including a difference between the first check and a portion of the first source code file, and
      in response to determining that applying the first check to the first source code file results in generating differential source code output, automatically requesting the repository to initiate a change request to request changes to the first source code file, the change request comprising metadata relating to the set of expected source code instructions of the first check;

repeating the applying and the determining, for all other checks in the plurality of stored checks;

repeating the accessing, the applying and the determining, for all other files in the plurality of files;

wherein the method is performed using one or more processors.

2. The method of claim 1, wherein the first check is configured to cause any one of: moving parameter values from a first library to a second library; adding instructions to a configuration file which when used in an executable build process causes collecting build metadata; modifications to contents of the first computer program source code file; adding hook code which when executed causes publishing information about a build; linting; causing a batch script embodied in the first computer program source code file to use one or more options; defining one or more assertions script embodied in the first computer program source code file; imposing a default configuration; adding security code to the first computer program source code file; adding copyright headers to the first computer program source code file; modifying terms of license files; ensuring that a plugin is in the first computer program source code file which when executed causes blacklisting the file.

3. The method of claim 1, wherein the determining step comprises:
  determining whether applying the first check results in creating a diff file in the repository;
  in response thereto, requesting the repository to initiate a pull request for the first source code file and for changes represented in the diff file;
  wherein initiating the pull request causes transmitting a notification to an account identified as an owner of the repository, receiving a confirmation of the notification, and merging the changes represented in the diff file into the first source code file.

4. The method of claim 3, further comprising requesting the repository to initiate a merge-when-ready pull request for the first source code file and for changes represented in the diff file.

5. The method of claim 1, wherein the first computer program source code file is associated with a human-readable programming language;
  further comprising executing the accessing, applying, determining and repeating steps using runtime instructions that have been dynamically linked to a first language driver among a plurality of different language drivers, the first language driver specifying which implementations of methods in the first check are to be used to provide functions, configuration parameters, or settings values that are specific to the human-readable programming language.

6. One or more non-transitory computer-readable media storing instructions, wherein the instructions, when executed by one or more processors, cause:
  accessing a first computer program source code file comprising a set of first source code instructions from among a plurality of files in a computer program source code repository;
  applying a first check to the first source code file, from among a plurality of stored checks, each of the checks comprising a set of expected source code instructions representing best practices or coding requirements and expected in one or more source code files, the best practices or coding requirements including configuration values or parameter settings that are specified in or required by policy or for compatibility;
  determining whether applying the first check to the first source code file results in generating differential source code output in the repository, including a difference between the first check and a portion of the first source code file, and in response to determining that applying the first check to the first source code file results in generating differential source code output, automatically requesting the repository to initiate a change request to request changes to the first source code file, the change request comprising metadata relating to the set of expected source code instructions of the first check;
  repeating the applying and the determining, for all other checks in the plurality of stored checks;
  repeating the accessing, the applying and the determining, for all other files in the plurality of files.

7. The one or more non-transitory computer-readable media of claim 6, wherein the first check is configured to cause any one of: moving parameter values from a first library to a second library; adding instructions to a configuration file which when used in an executable build process causes collecting build metadata; modifications to contents of the first computer program source code file; adding hook code which when executed causes publishing information about a build; linting; causing a batch script embodied in the first computer program source code file to use one or more options; defining one or more assertions script embodied in the first computer program source code file; imposing a default configuration; adding security code to the first computer program source code file; adding copyright headers to the first computer program source code file; modifying terms of license files; ensuring that a plugin is in the first computer program source code file which when executed causes blacklisting the file.

8. The one or more non-transitory computer-readable media of claim 6, wherein the instructions for determining comprise instructions which when executed cause:
  determining whether applying the first check results in creating a diff file in the repository;
  in response thereto, requesting the repository to initiate a pull request for the first source code file and for changes represented in the diff file;
  wherein initiating the pull request causes transmitting a notification to an account identified as an owner of the repository, receiving a confirmation of the notification, and merging the changes represented in the diff file into the first source code file.

9. The one or more non-transitory computer-readable media of claim 8, wherein the instructions, when executed by one or more processors, further cause requesting the repository to initiate a merge-when-ready pull request for the first source code file and for changes represented in the diff file.

10. The one or more non-transitory computer-readable media of claim 6, wherein the first computer program source code file is associated with a human-readable programming language;
  further comprising instructions which when executed cause executing the accessing, applying, determining and repeating steps using runtime instructions that have been dynamically linked to a first language driver among a plurality of different language drivers, the first language driver specifying which implementations of methods in the first check are to be used to provide functions, configuration parameters, or settings values that are specific to the human-readable programming language.

* * * * *